United States Patent [19]
Anthony

[11] Patent Number: 4,548,468
[45] Date of Patent: Oct. 22, 1985

[54] LOAD-BEARING REAR-PROJECTION SCREEN

[76] Inventor: Dennis R. Anthony, 3119 Kelton Ave., Los Angeles, Calif. 90034

[21] Appl. No.: 611,316

[22] Filed: May 17, 1984

[51] Int. Cl.$^4$ ............................................. G03B 21/56
[52] U.S. Cl. ..................................... 350/117; 352/47; 353/28; 354/291
[58] Field of Search ................................ 354/290–292; 352/47, 48; 350/117, 123, 129; 353/28, 81

[56] References Cited

U.S. PATENT DOCUMENTS

| | | | |
|---|---|---|---|
| 2,174,931 | 10/1939 | Terry et al. | 352/47 X |
| 2,275,270 | 3/1942 | Rackett | 352/47 X |
| 2,888,857 | 6/1959 | Stevenson et al. | 354/290 |
| 3,517,447 | 6/1970 | Fox | 354/292 X |
| 4,067,026 | 1/1978 | Pappanikolaou | 354/291 X |

Primary Examiner—Richard A. Wintercorn

[57] ABSTRACT

The invention pertains in general to the art of motion-picture photography and in particular to rear-projection "process" photography, providing a rigid rear-projection screen onto which heavy objects, such as props and actors, may be placed while imagery is projected onto it from the side opposite to the said objects. The screen consists of a rigid sheet on which a light-scattering surface has been established and which rests on pseudotransparent supports, each of which consists of an opaque structural member, a block of transparent material, and three mirrors so arranged to make light detour around the structural member.

1 Claim, 2 Drawing Figures

LOAD-BEARING REAR-PROJECTION SCREEN

The invention pertains in general to the art of motion-picture photography and in particular to rear-projection "process" photography, providing a rigid rear-projection screen onto which heavy objects, such as props and actors, may be placed while imagery is projected onto it from the side opposite to the said objects. The screen consists of a rigid sheet on which a light-scattering surface has been established and which rests on pseudotransparent supports, each of which consists of an opaque structural member, a block of transparent material, and three mirrors so arranged to make light detour around the structural member.

BRIEF DESCRIPTION OF THE PRIOR ART

In the making of motion pictures it is often desirable to combine the images of actors and props with background images photographed elsewhere at another time. Some of those background images are in the form of stock footage from film libraries. One technique that is commonly used involves putting the actors and props in front of a semitransparent light-scattering screen, illuminating the actors and props, and photographing them while simultaneously projecting the desired background images onto the screen from its rear.

The screens used for rear-projection photography are made of thin sheets of transparent material on which a light-scattering surface has been established, usually by painting one side of the material with glass dust suspended in a suitable resin. Because imagery is projected onto the screen from its rear, it is considered axiomatic that no solid object can be put behind a rear-projection screen and thus that a rear-projection screen cannot be made strong enough to support any substantial force imposed upon it. However, there are situations in which it is desirable that a rear-projection screen also function as a floor upon which actors can walk. The present invention provides a rear-projection screen suitable for such a purpose.

SUMMARY OF THE INVENTION

A motion-picture scene in which a load-bearing rear-projection screen is desirable, if not necessary, is exemplified by one in which a man consults a witch who reads clairvoyant information from a pattern of luminous ripples emanating from a large stone floor.

According to the present invention a load-bearing rear-projection screen suitable for use in the creation of scenes like the above comprises a sheet of rigid transparent material, upon which a semitransparent light-scattering surface is established and which rests upon one or more pseudotransparent supports. A pseudotransparent support consists of a block of transparent material bonded to a mirror on top of a steel I-beam or other suitable load-bearing member, a mirror mounted to the bottom of the load-bearing member, and a mirror mounted alongside the load-bearing member, the three mirrors being so arranged that light aimed to strike the bottom of the load-bearing member will be made to detour around the member and strike the appropriate area of the sheet of rigid transparent material. Because the optical action of the pseudotransparent support reverses, left for right, the rays in the light striking the lowest mirror, it will often be desirable to mount below the pseudotransparent support a Dove prism or a Dove prism equivalent to "prereverse" the light striking the lowest mirror so that the optical action of the pseudotransparent support will then restore the correct relationship among the rays in the light.

THE PREFERRED EMBODIMENTS

I will now describe the preferred embodiments of my invention in appropriate detail with reference to the accompanying drawings, in which.

Figure 1:
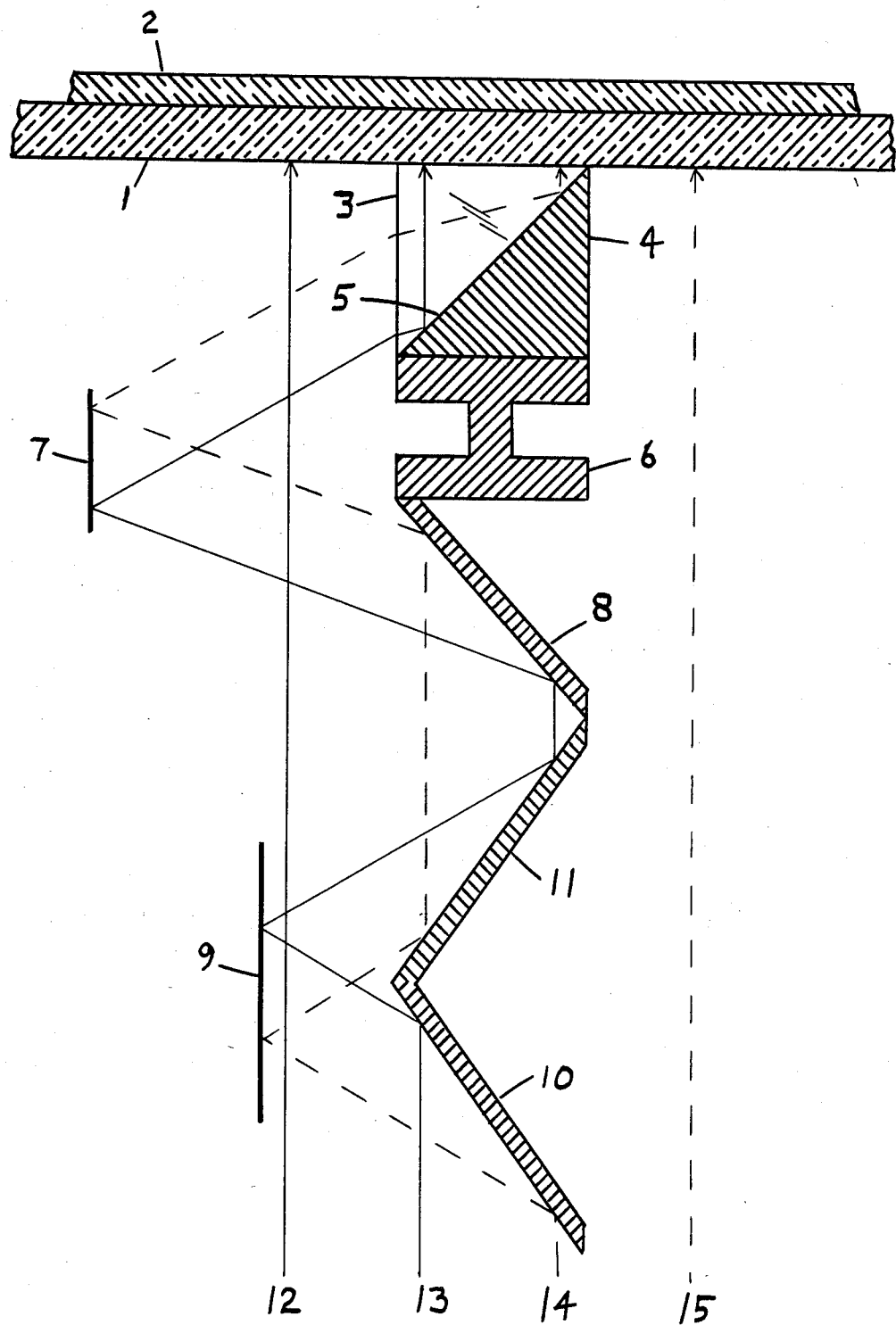
FIG. 1 is a cross sectional view of a load-bearing rear-projection screen.

In the embodiment of FIG. 1 of the drawings a load-bearing rear-projection screen comprises a sheet 1 of rigid transparent material upon which a semitransparent light-scattering layer 2 has been established, a block 3 of transparent material bonded to a matching block 4 at a reflective surface 5, a steel I-beam 6, and flat mirrors 7 and 8. A Dove prism equivalent suitable for use in the embodiment of FIG. 1 of the drawings (and already claimed in a separate application) comprises three mirrors 9, 10, and 11 so arranged that light striking the mirror 10 is reflected to the mirror 9 and thence to the mirror 11 which reflects it onto a path parallel to its original path.

To illustrate the optical action of the embodiment of FIG. 1 of the drawings four rays of lights 12, 13, 14, and 15 are shown initially following paths perpendicular to the surface of the sheet 1. The rays 12 and 15 pass directly to the sheet 1, through which they pass to be scattered by the rear-projection layer 2, which may be a sheet of conventional rear-projection screen material that is glued to the sheet 1. The rays 13 and 14 pass through the Dove prism equivalent, being reversed in their left-right relationship, then are reflected from the mirror 8 toward the mirror 9, from the mirror 9 to the transparent block 3, are refracted by the transparent block 3 onto the reflective surface 5, and are reflected by the surface 5 toward the sheet 1, being restored to their original left-right relationship in being detoured around the I-beam 6.

To ensure that the apparatus diagrammed in FIG. 1 does not defeat its own purpose by casting shadows upon itself two fundamental precautions will be taken. First, the light being projected onto the apparatus will be made of rays that are as close to being perfectly parallel as is practical by projecting it from a distance large compared to the dimensions of the apparatus and the mirror 7, the sides of the transparent block 3, and the sides of the block 4 will be made parallel to each other and parallel to the light being projected onto the apparatus. And second, the mirror 7 will be made as thin as possible and will be suspended by thin wires or strings.

Figure 2:
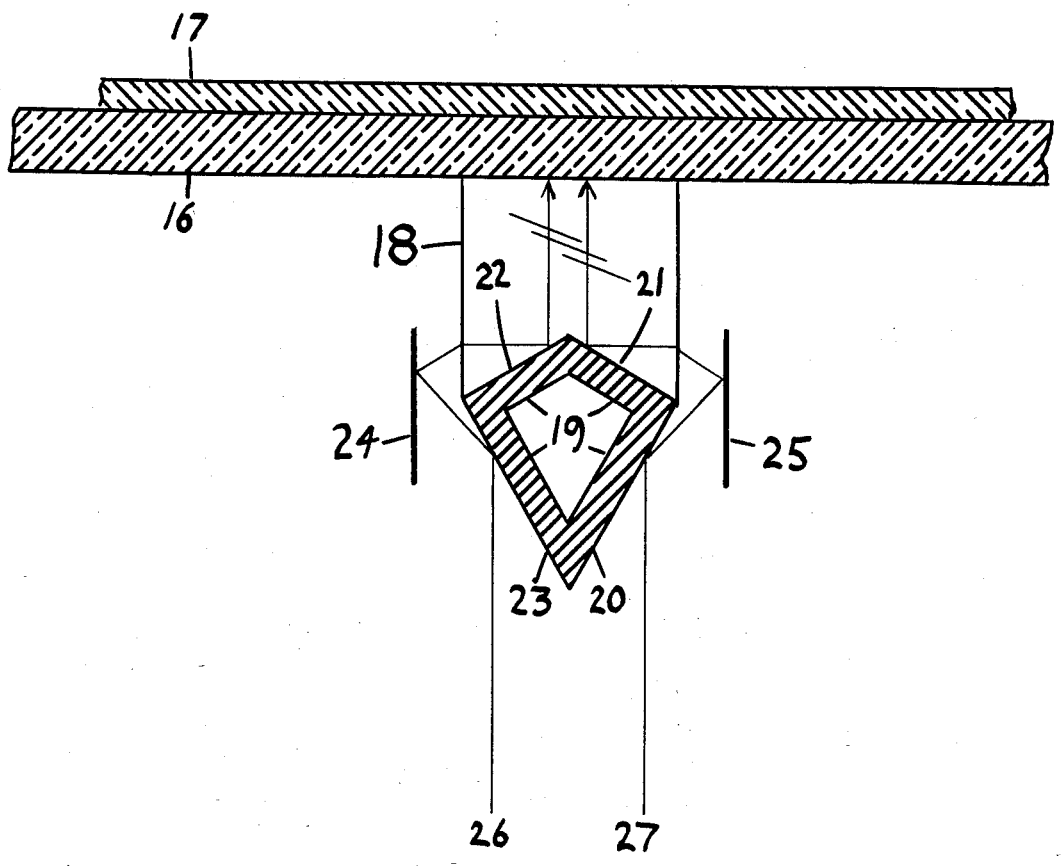
FIG. 2 is a cross sectional view of an alternative load-bearing rear-projection screen.

In the embodiment of FIG. 2 of the drawings an alternative load-bearing rear-projection screen comprises a sheet 16 of rigid transparent material upon which a semitransparent light-scattering layer 17 has been established, a block 18 of transparent material bonded to a structural beam 19 with reflective surfaces 20, 21, 22, and 23, and flat mirrors 24 and 25. The optical action of the embodiment of FIG. 2 of the drawings is illustrated by the light rays 26 and 27. The apparatus is shown without a Dove prism equivalent because in some instances the imagery being projected through the apparatus will not be spoiled by the left-right reversal of the rays passing through the pseudotransparent support. In making the pseudotransparent support the angle between the reflective surfaces 21 and 22 is made larger than the angle between the surfaces 20 and 23 to compensate for the different angle at which light strikes the surfaces 21 and 22 due to refraction in the transparent block 18.

In accordance with the foregoing specification and its accompanying drawings, I claim as my invention:

1. A load-bearing rear-projection screen, which load-bearing rear-projection screen comprises a rigid sheet of transparent material upon which a semitransparent light-scattering surface is established and which is supported on one or more pseudotransparent supports, each of which pseudotransparent supports comprises a suitable load-bearing structural member; a mirror mounted on top of the said structural member; a flat-topped block of transparent material, which block fits over the mirror mounted on top of the structural member and is bonded to it; a mirror mounted on the underside of the structural member; and a flat mirror so mounted alongside the structural member that it receives light reflected from the mirror mounted on the underside of the structural member and reflects it to the mirror mounted on top of the stuctural member.

* * * * *